(12) United States Patent
Wilk

(10) Patent No.: US 7,309,235 B2
(45) Date of Patent: Dec. 18, 2007

(54) INSTRUCTIONAL SHOELACES, AN INSTRUCTIONAL SHOELACE-TYING SYSTEM, AND A METHOD OF TYING INSTRUCTIONAL SHOELACES

(76) Inventor: Kelly A. Wilk, 1035 5th Ave. North, Naples, FL (US) 34102

( * ) Notice: Subject to any disclaimer, the term of this patent is extended or adjusted under 35 U.S.C. 154(b) by 79 days.

(21) Appl. No.: 11/159,050

(22) Filed: Jun. 22, 2005

(65) Prior Publication Data

US 2005/0260550 A1    Nov. 24, 2005

Related U.S. Application Data

(63) Continuation of application No. 10/035,104, filed on Jan. 3, 2002, now abandoned.

(51) Int. Cl.
*G09B 19/24* (2006.01)
(52) U.S. Cl. .................................... 434/260
(58) Field of Classification Search ................ 434/258, 434/259, 260, 712
See application file for complete search history.

(56) References Cited

U.S. PATENT DOCUMENTS

| | | | |
|---|---|---|---|
| 2,646,630 A | 7/1953 | Miller | |
| 4,017,984 A | 4/1977 | Bonfigli | |
| 4,342,557 A | 8/1982 | Bandar | |
| 4,553,342 A * | 11/1985 | Derderian et al. | ............. 36/97 |
| 4,721,468 A | 1/1988 | Alexander et al. | |
| 4,764,119 A | 8/1988 | Miraglia | |
| 4,842,522 A | 6/1989 | Alexander et al. | |
| 5,110,296 A * | 5/1992 | Cohen | ....................... 434/260 |
| 5,209,667 A | 5/1993 | Stanfield | |
| 5,240,418 A * | 8/1993 | Silverman et al. | .......... 434/260 |
| 5,430,621 A * | 7/1995 | Raskas | ....................... 362/570 |
| 5,562,457 A * | 10/1996 | Haslam | ...................... 434/260 |
| 5,611,692 A | 3/1997 | Gehrdes | |
| 5,639,244 A | 6/1997 | Stricklin | |
| 5,832,574 A | 11/1998 | Shin | |
| 6,167,599 B1 | 1/2001 | Chen | |
| D479,393 S | 9/2003 | Weitzman | |
| 6,746,249 B1 | 6/2004 | Claunch | |
| 6,872,079 B1 | 3/2005 | Herndon | |

* cited by examiner

*Primary Examiner*—Kurt Fernstrom
(74) *Attorney, Agent, or Firm*—Doonan Dwight McGraw

(57) ABSTRACT

An instructional system for teaching the tying of shoelaces using at least one shoelace (1) having a first half section (2) which is preferably light in color, for example, yellow, and a second half section (3), which is preferably dark in color, for example, blue. The two half sections (2) and (3) are permanently secured to one another to form the shoelace (1). Markings (5) are located at a predetermined distance on the first half section (2) of the shoelace (1) to assist a person in learning to tie a shoelace (1).

10 Claims, 4 Drawing Sheets

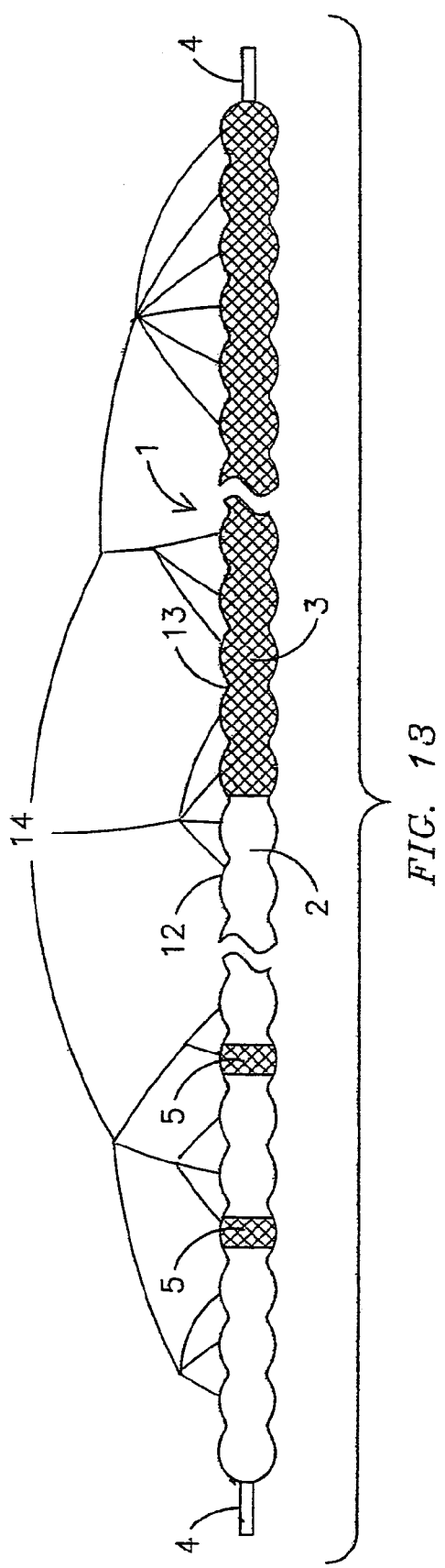

INSTRUCTIONAL SHOELACES, AN INSTRUCTIONAL SHOELACE-TYING SYSTEM, AND A METHOD OF TYING INSTRUCTIONAL SHOELACES

CROSS-REFERENCE TO RELATED APPLICATION

This is a continuation of application Ser. No. 10/035,104, filed Jan. 3, 2002, now abandoned.

BACKGROUND OF THE INVENTION

This invention relates to instructional shoelaces, more specifically, instructional shoelaces which provide a multi-sensory approach to teaching individuals the skill of tying the laces of their shoes and the instructional system utilized in conjunction with the instructional shoelaces.

The skill of tying one's shoe is often taught to children of a young age by adults. Traditionally, the adult recites a story or rhyme about a bunny traveling through the woods while showing the child how to properly tie shoelaces and, through a large amount of practice, the child eventually learns how to tie the shoelaces without the assistance of another. This is a major accomplishment in the life of a child, as well as the adult who taught the child how to tie the laces.

However, there are a large number of individuals who have difficulty learning how to tie one's shoes using the "traditional" method of learning. Be it young children with developmental disabilities such as autism, adults who have suffered a neurological event which caused brain injury or any variation therebetween, some individuals simply have difficulty in learning how to tie one's shoelaces. This causes not only frustration to the individual learning to tie the laces, but could also lead to feelings of sadness and disappointment.

It is a well-known fact that there are various learning styles available and by knowing one's own learning style, one will learn the subject matter with greater success. These styles include auditory, wherein a person learns by listening; visual, wherein a person learns by watching and kinesthetic, wherein a person learns by moving, doing and touching. Although a person may excel in one type of style, many often learn more by combining at least two, if not all three, styles together.

Using the above known learning styles, it would be most beneficial to individuals having difficulty learning to tie one's own shoe by providing a means for the individual to learn using a multi-sensory approach, thereby targeting the individual's own learning style and reinforcing the lesson by utilizing additional learning styles.

Thus, a need exists for instructional shoelaces wherein a multi-sensory approach is utilized to teach individuals how to tie shoelaces.

The relevant prior art includes the following references:

| U.S. Pat. No. (U.S. unless stated otherwise) | Inventor | Issue/Publication Date |
|---|---|---|
| 4,764,119 | Miraglia | Aug. 16, 1988 |
| 5,611,692 | Gehrdes | Mar. 18, 1997 |
| D479,393 | Weitzman | Sep. 09, 2003 |
| 4,342,557 | Bandar | Aug. 03, 1982 |
| 4,721,468 | Alexander et al. | Jan. 26, 1988 |
| 4,842,522 | Alexander et al. | Jun. 27, 1989 |
| 4,017,984 | Bonfigli | Apr. 19, 1977 |
| 6,872,079 | Herndon | Mar. 29, 2005 |
| 5,639,244 | Stricklin | Jun. 17, 1997 |
| 6,746,249 | Claunch | Jun. 08, 2004 |
| 5,430,621 | Raskas | Jul. 04, 1995 |
| 5,562,457 | Haslam | Oct. 08, 1996 |
| 5,209,667 | Stanfield | May 11, 1993 |
| 2,646,630 | Miller | Jul. 28, 1953 |
| 5,832,574 | Shin | Nov. 10, 1998 |
| 6,167,599 | Chen | Jan. 02, 2001 |
| 5,240,418 | Silverman et al. | Aug. 31, 1993 |

SUMMARY OF THE INVENTION

The primary object of the present invention is to provide instructional shoelaces that provide a multi-sensory approach to learning how to tie shoelaces.

Another object of the present invention is to provide instructional shoelaces that are easy to use.

A further object of the present invention is to provide instructional shoelaces that are fun to use.

Another object of the present invention is to provide instructional shoelaces that actually stay tied.

An even further object of the present invention is to provide an instructional system for tying one's shoelaces utilizing the instructional shoelaces.

The present invention fulfills this and other objects by providing instructional shoelaces that are bi-colored and have markings thereupon to indicate where a person is to hold the shoelace. When used in combination with the directions taught herein, the instructional laces are used in a multi-sensory manner so as to create a most beneficial learning environment.

BRIEF DESCRIPTION OF THE DRAWINGS

FIG. 13 is a side view of a second embodiment of an instructional shoelace of the present invention.

DESCRIPTION OF THE PREFERRED EMBODIMENT

Figure 1:
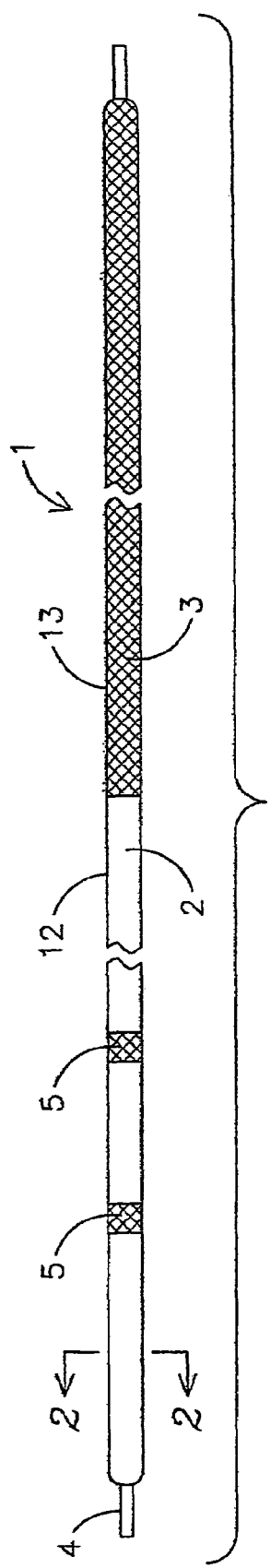
FIG. 1 is a side view of a first embodiment of an instructional shoelace of the present invention.

For purposes of describing the preferred embodiment, the terminology used in reference to the numbered components in the drawings is as follows:

1. instructional shoelace, generally
2. first half section
3. second half section
4. shoelace tip
5. marking
6. shoelace weave
7. shoe
8. eyelet
9. left hand
10. right hand
11. bow
12. first color
13. second color
14. ridge With reference to FIG. 1, a side view of a first embodiment of an instructional shoelace of the present invention is shown. The instructional shoelace 1, which is preferably woven of polyester fibers and oval in circumference, comprises a first half section 2 having a predetermined first color 12 which is preferably light in color, for example, yellow, and a second half section 3 having a predetermined second color 13, which is preferably dark in color, for example, blue. The two half sections 2 and 3 are permanently secured to one another to form a shoelace, preferably 51 inches in length. The ends of the shoelace 1 have tips 4 to aid in threading the shoelace 1 through shoes. Markings 5 are located at a predetermined distance on the first half section 2 of the shoelace 1. The markings 5 are preferably the same color as the second half section 3 of the shoelace 1.

Figure 2:
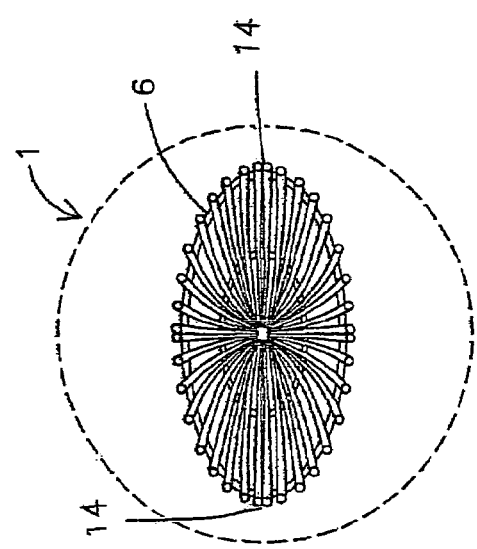
FIG. 2 is a cross-sectional view along line 2-2 of the instructional shoelace of the present invention.
Figure 4:
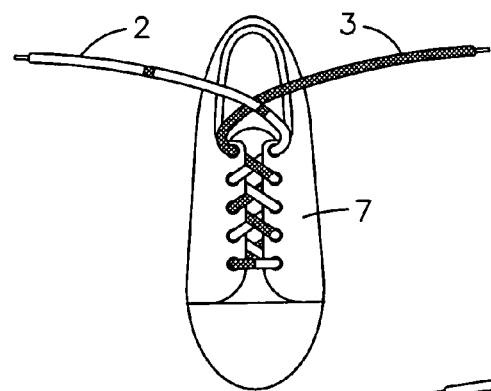
FIG. 4 is a top view of a second step of the method for tying an instructional shoelace of the present invention on a left shoe.
Figure 5:
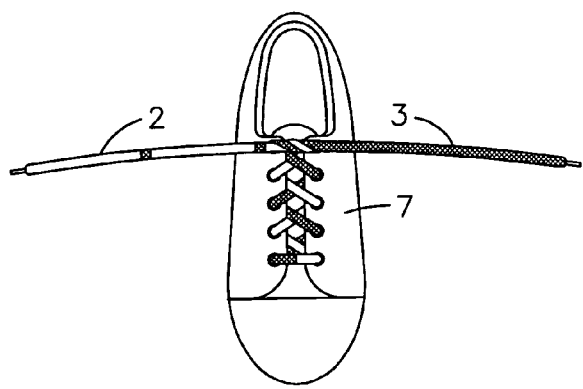
FIG. 5 is a top view of a third step of the method for tying an instructional shoelace of the present invention on a left shoe.
Figure 6:
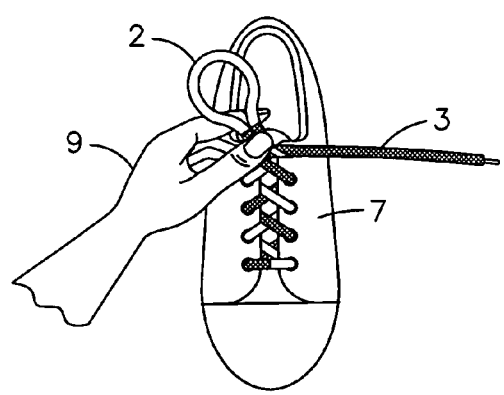
FIG. 6 is a top view of a fourth step of the method for tying an instructional shoelace of the present invention on a left shoe.
Figure 7:
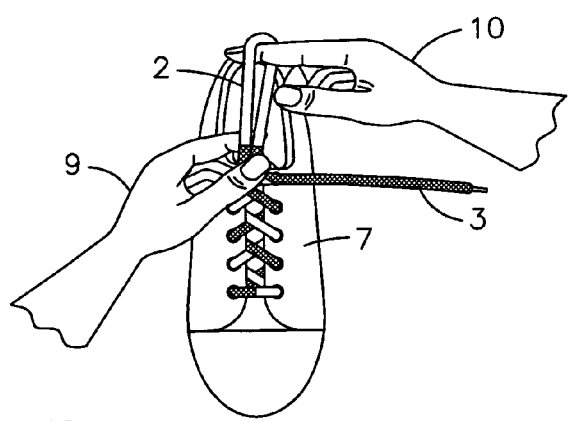
FIG. 7 is a top view of a fifth step of the method for tying an instructional shoelace of the present invention on a left shoe.
Figure 8:
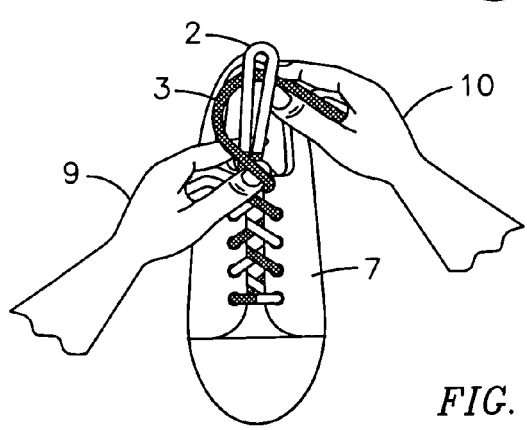
FIG. 8 is a top view of a sixth step of the method for tying an instructional shoelace of the present invention on a left shoe.
Figure 9:
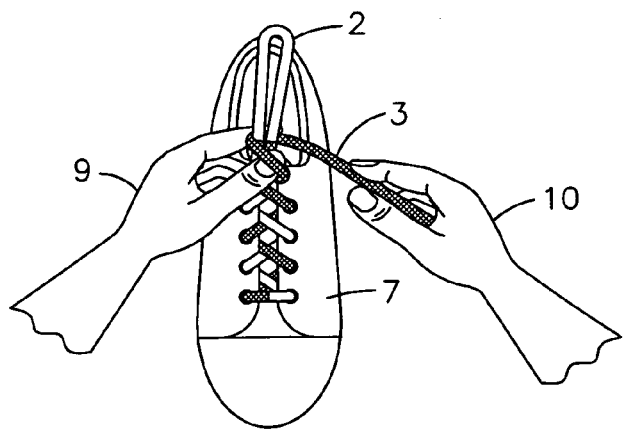
FIG. 9 is a top view of a seventh step of the method for tying an instructional shoelace of the present invention on a left shoe.
Figure 10:
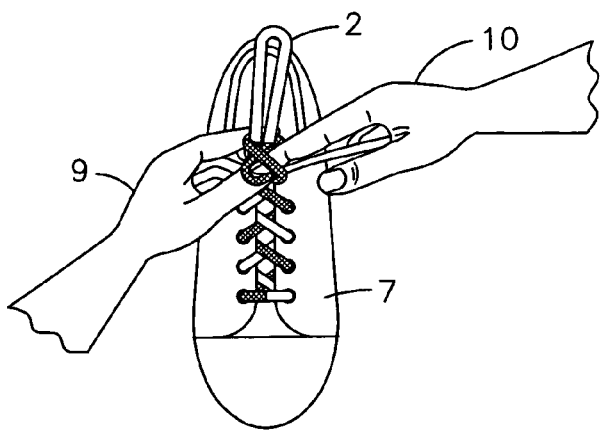
FIG. 10 is a top view of a eighth step of the method for tying an instructional shoelace of the present invention on a left shoe.
Figure 11:
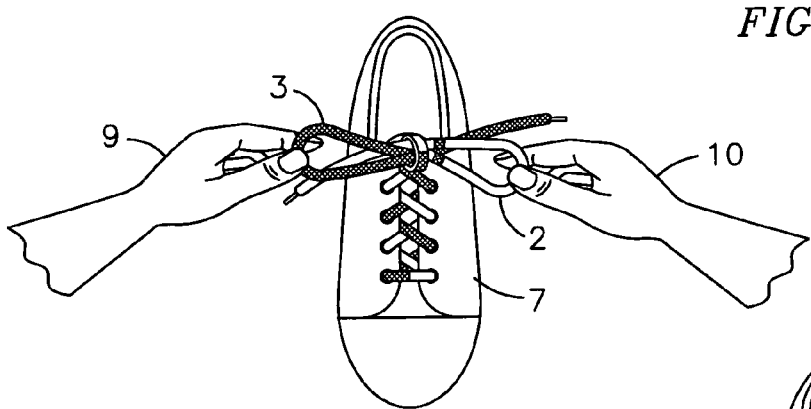
FIG. 11 is a top view of a ninth step of the method for tying an instructional shoelace of the present invention on a left shoe.
Figure 12:
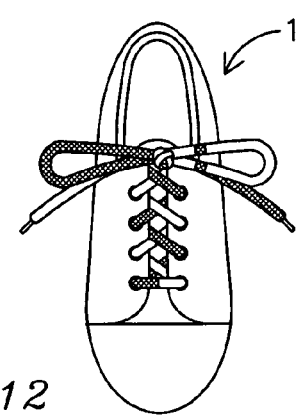
FIG. 12 is a top view of a tenth step of the method for tying an instructional shoelace of the present invention on a left shoe.

In FIG. 2, a cross-sectional view along line 2-2 of the instructional shoelace 1 of the present invention is shown. The shoelace weave 6 is designed in such a manner so as to provide a thick and somewhat bendable shoelace 1 in order to permit individuals to form loops and bows easier when learning to tie a shoelace 1. The circumference is preferably 0.5 inches.

Figure 3:
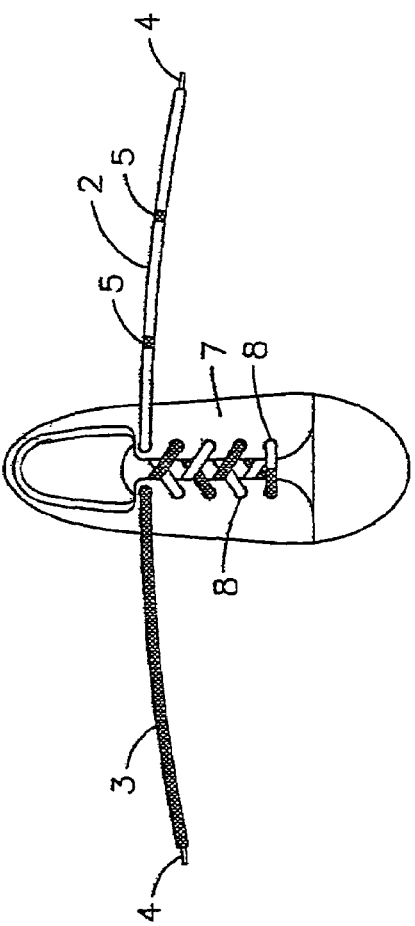
FIG. 3 is a top view of a first step of a method for tying an instructional shoelace of the present invention on a left shoe.

With reference to FIGS. 3-12, the steps of a method for tying an instructional shoelace of the present invention is shown on a left shoe. The method may include how to lace a shoe 7 whereby the instructional shoelace 1 is threaded through the eyelets 8 of the shoe. However, this is not a fundamental step in the shoelace tying method. If the individual is left-handed, lace the shoe 7 so the first section half 2 exits the eyelet 8 of the shoe 7 on the right hand side (as shown in FIG. 3). If the individual is right-handed, lace the shoe 7 so the first section half 2 exits the eyelet 8 of the shoe 7 on the left hand side (not shown). The method described below is for use by left-handed individuals. If the individual to be taught is right handed, then the hand placements described below will be reversed.

Assuming the shoe 7 is already laced, the instructor first seats an individual at a table that permits a clear view of the shoe 7 and places the shoe 7 in front of the individual so the toe is pointing towards the individual. The individual grasps both half sections 2 and 3 of the shoelace 1 and extends the shoelace 1 to its full length perpendicular to the shoe 7.

Then, the instructor asks the individual to grasp the second half section 3 and drape it over the shoe 7 and grasp the first half section 2 and drape it over the second half section 3 to form an "X." Intertwine the two half sections 2 and 3 to form a base of a knot.

Next, the instructor asks the individual to grasp the first section 2 of the lace on the markings 5 using his/her left hand 9 and pinch the markings 5 together to form a loop. The instructor then encourages the individual to use a pinching grasp between an index finger and a thumb and then have the individual tug on the loop with his/her right hand 10 to make sure he/she is holding the first section 2 tightly.

Next, the instructor asks the individual to use his/her right hand 10 to pick up the second half section 3 and wrap it around in front of the loop. Then, the individual drops the second half section 3 over a right side of the shoe 7.

Then, using a thumb on the left hand 9 as a stabilizer, the individual uses an index finger on the right hand 10 to push the second half section 3 through an opening created by the loop.

Now, the individual may release his/her grip on the pinched markings 5 and grasps the second half section 3. Finally, the individual pulls on the loops sideways to form a bow 11.

The bow 11 may be double-knotted (not shown) so as to further secure the bow and prevent the individual from tripping over excessively long laces.

When the instructional shoelaces 1 of the present invention are used in conjunction with the method for tying an instructional shoelace 1 described above, an instructional system for tying instructional shoelaces 1 is created.

Finally, with reference to FIG. 13, a second embodiment of an education shoelace of the present invention is shown. Similar to the first embodiment, the second embodiment of the educational shoelace 1 of the present invention is preferably woven of polyester fibers and oval in circumference, has a first half section 2, which is preferably light in color, for example, yellow, and a second half section 3, which is preferably dark in color, for example, blue. The two half sections 2 and 3 are permanently secured to one another to form a shoelace, preferably 51 inches in length. The ends of the shoelace 1 have tips 4 to aid in threading the shoelace 1 through shoes. Markings 5 are located at a predetermined distance on the first half section 2 of the shoelace 1. The markings 5 are preferably the same color as the second half section 3 of the shoelace 1. However, the second embodiment of the educational shoelace 1 includes a plurality of ridges 14 located thereon to permit a person to easily grasp and hold the educational shoelace 1, thereby making shoelace tying easier and less frustrating to learn.

When the embodiment of the shoelace 1 shown in FIG. 13 is oval in cross section as shown in FIG. 2, the thickest parts of the ridges 14 can be located on the longer sides of the oval, and they are so shown in FIG. 13 when it is considered that the oval cross section of the shoelace is being seen in elevation while looking at one of the ends of that cross section oval. It can be readily understood that the ridges 14 may be spaced longitudinally further apart on the shoelace 1 than they are shown in FIG. 13 without departing from the scope of the invention.

Although the preferred cross section of the shoelace 1 is oval, as earlier stated, it is within the scope of the invention that the shoelace 1 may have other cross section shapes, the most common one being a circular cross section shape.

When that is the cross section configuration of the shoelace 1 of FIG. 13, the ridges 14 may also be circular with a larger diameter than the parts of the shoelace between the ridges.

It is also within the scope of the invention that, particularly with an oval shoelace cross section shown in FIG. 2 which has ridges 14, and as well as the ridges 14 of FIG. 13, may be on only one of, or on both of, the longer sides of the oval, or may be arranged to alternate longitudinally of the shoelace 1 so that they are first on one of the longer sides of the oval, and then on the other of the longer sides of the oval. This has the result that a particular ridge 14 does not encircle the shoelace 1, but is just a relatively short longitudinally extending ridge. When the ridges are constructed in that manner, but on diametrically opposite sides of a basically circular cross section shoelace, the effective cross section views of the ridges are seen either as an oval if the ridges are diametrically aligned, or as a major part of an oval with one end thereof being removed.

It is also to be understood that the ridges 14 of FIG. 13 may have their maximum cross section thicknesses to be only sufficiently larger than the portions of the shoelace 1 between adjacent ridges to be able to be grasped, and thus the considerably larger diameter of the ridges 14 as shown in FIG. 13, as compared to the diameter of the portions of the shoelace 1 lying between two adjacent ridges 14 of that Figure, are not shown as limitations but only to be able to clearly illustrate the fact that there is a difference in such diameters.

The use of the present invention will provide a multi-sensory, also known as a multi-modal, approach to tying shoelaces.

The use of the present invention is also taught in the Inventor's Book *Shoe-Tying Made Simple*.

It is to be understood that while preferred embodiments of the invention are illustrated, it is not to be limited to the specific form or arrangements of parts herein described and shown. It will be apparent to those skilled in the art that various changes may be made without departing from the scope of the invention and the invention is not to be considered limited to what is shown or described in the specification and drawings.

Having thus claimed my invention, I claim:

1. An instructional shoelace having opposite ends and being of a predetermined total length between said opposite ends, said shoelace comprising:

first and second half sections of substantially half of said shoelace predetermined total length each and having outer ends with tips and inner ends with said inner ends being permanently secured together to form said shoelace; each of said first and second half sections having at least one ridge intermediate its said inner and outer ends, said at least one ridge extending a defined distance along the length thereof;

said shoelace first half section having a predetermined first color and said second half section having a predetermined second color;

at least one of said first and second half sections having at least one marking located thereon for aiding in tying a bow in said shoelace after said shoelace has been laced onto a shoe by identifying the area of said at least one half section of said shoelace is to have another part of said at least one half section of said shoelace to cross over said marking to form a loop by said at least one half section of said shoe lace.

2. The shoelace of claim 1 wherein said first and second colors of said shoelace are sharply contrasting colors, and said at least one marking has a color that also is sharply contrasting with the shoelace half section on which it is located.

3. The shoelace of claim 1 in which said ridges are bands extending at least a short defined linear distance along said lengths of said shoelace half sections and also are extending in a generally circular manner about said shoelace half sections so that they are of substantially larger maximum diameter than the spaces longitudinally separating said ridges.

4. The shoelace of claim 3 in which said ridges are colored one of said predetermined colors and said spaces longitudinally separating said ridges are colored a contrasting color which is the other of said predetermined colors.

5. The shoelace of claim 1 in which said ridges extend in longitudinally spaced relation along most of the length of each of said shoelace half sections.

6. The shoelace of claim 1 in which said ridges provide more positive gripping areas of each of said shoelace half sections than do shoelaces without such ridges, so that they are particularly helpful when young children are trying to grip the shoelace as they are being taught how to tie shoelaces, and are tying them thereafter.

7. The shoelace of claim 1 in which said ridges have arcuately outward extending surfaces that are separated by diametrically smaller surfaces of said shoelace.

8. The shoelace of claim 7 in which at least one of said ridges of each of said shoelace half sections extends at least part way around each of said shoelace half sections.

9. A method for tying an instructional shoelace having first and second half sections of substantially half of the instructional shoelace total length and having outer ends with tips and inner ends with those inner ends permanently secured together to form the shoelace, and each of the half sections having at least one ridge intermediate its said inner and outer ends, the at least one ridge extending at least a short distance along the length thereof; at least one of the first and second half sections having at least one marking located thereon for aiding in tying a bow knot in the shoelace after the shoelace has been laced into a shoe;

said method comprising the steps of:

a. extending the first and second half sections substantially perpendicularly from the laced shoe;

b. grasping the shoelace second half section and draping it over the shoe;

c. grasping the first half section and crossing it over the second half section;

d. intertwining the first and second half sections to form a simple overhand knot;

e. pinching at least one of each of two of the at least one of the markings on the first section together to form a first loop;

f. wrapping the second half section around the first loop to form a second loop;

g. pushing the second half section second loop through the first loop;

h. releasing the pinched-together markings and i. grasping the first and second loops; then j. pulling the first and second loops in opposite directions to form a bow knot.

10. The method of claim 9 further comprising the step of:

k. double-knotting the bow knot by tying said first and second loops together in a knot.

* * * * *